United States Patent [19]
Cox

[11] Patent Number: 5,138,690
[45] Date of Patent: Aug. 11, 1992

[54] FIBER IDENTIFIER

[75] Inventor: Larry R. Cox, Austin, Tex.

[73] Assignee: Minnesota Mining and Manufacturing Company, St. Paul, Minn.

[21] Appl. No.: 590,011

[22] Filed: Sep. 28, 1990

[51] Int. Cl.$^5$ .............................................. G02B 6/42
[52] U.S. Cl. ..................................... 385/137; 385/31; 385/88
[58] Field of Search ............... 350/96.10, 96.15, 96.20, 350/96.29; 356/73.1; 250/227.14, 227.15, 227.16, 227.24; 385/31, 32, 48, 137, 147, 88, 92

[56] References Cited

U.S. PATENT DOCUMENTS

| | | | |
|---|---|---|---|
| 4,586,783 | 5/1986 | Campbell et al. | 350/96.15 |
| 4,728,169 | 3/1988 | Campbell et al. | 350/96.15 |
| 4,747,652 | 5/1988 | Campbell et al. | 350/96.15 |
| 4,759,605 | 7/1988 | Shen et al. | 350/96.15 |
| 4,790,617 | 12/1988 | Campbell et al. | 350/96.15 |
| 4,824,199 | 4/1989 | Uken | 350/96.15 |
| 4,834,482 | 5/1989 | Campbell et al. | 350/96.15 |
| 4,961,620 | 10/1990 | Uken et al. | 350/96.15 |
| 4,981,334 | 1/1991 | Sniadower | 350/96.15 |

FOREIGN PATENT DOCUMENTS

| | | |
|---|---|---|
| 325382 | 7/1989 | European Pat. Off. |
| 326250 | 8/1989 | European Pat. Off. |
| 60-79244 | 5/1985 | Japan |
| WO88/07689 | 10/1988 | PCT Int'l Appl. |

OTHER PUBLICATIONS

LightWave, May 1990, Intelco's 401 fiber indentifier advertisement.
LightWave, Nov. 1989, Beale's fiber detector advertisement.
TE&M magazine, Jun. 15, 1989, Northern Telecom's "Identifiber II" advertisement.

*Primary Examiner*—Frank Gonzalez
*Attorney, Agent, or Firm*—Gary L. Griswold; Walter N. Kirn; Jack V. Musgrove

[57] ABSTRACT

A fiber identifer for detecting the presence or absence of an active data signal or a test signal in an optical fiber. The instrument includes a piston which positions a portion of the fiber under test against an optical detector, the piston being located within a housing, and the housing being attached to a drive rod. The rod is responsive to a levered actuation mechanism, but a damper controls the movement rate of the rod, and hence the piston, to slowly bend the fiber, minimizing disruption of any signal flowing through the fiber and preventing undue mechanical stress which could damage the fiber. A precision spring within the housing is used to limit the pressure applied by the piston against the optical fiber. The housing also includes a novel arrangement of electrical contacts to sense the position of the piston and, indirectly, the position of the rod.

23 Claims, 4 Drawing Sheets

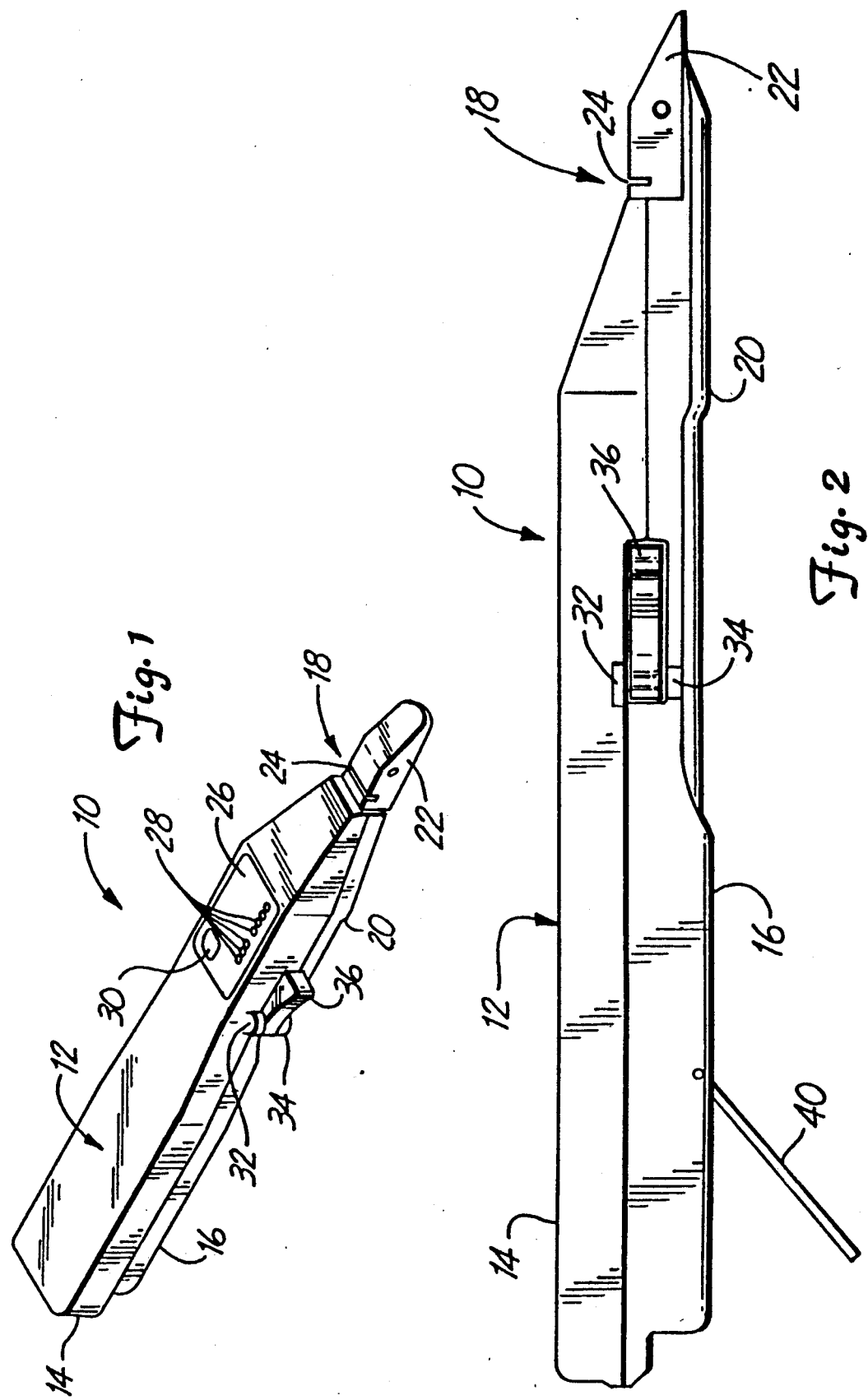

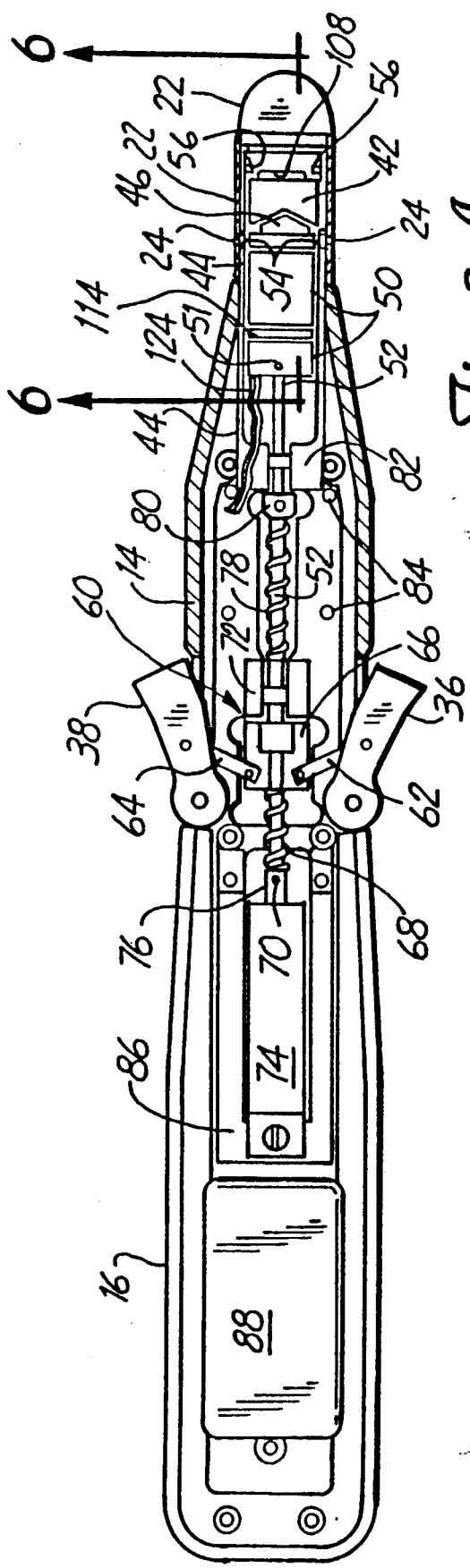
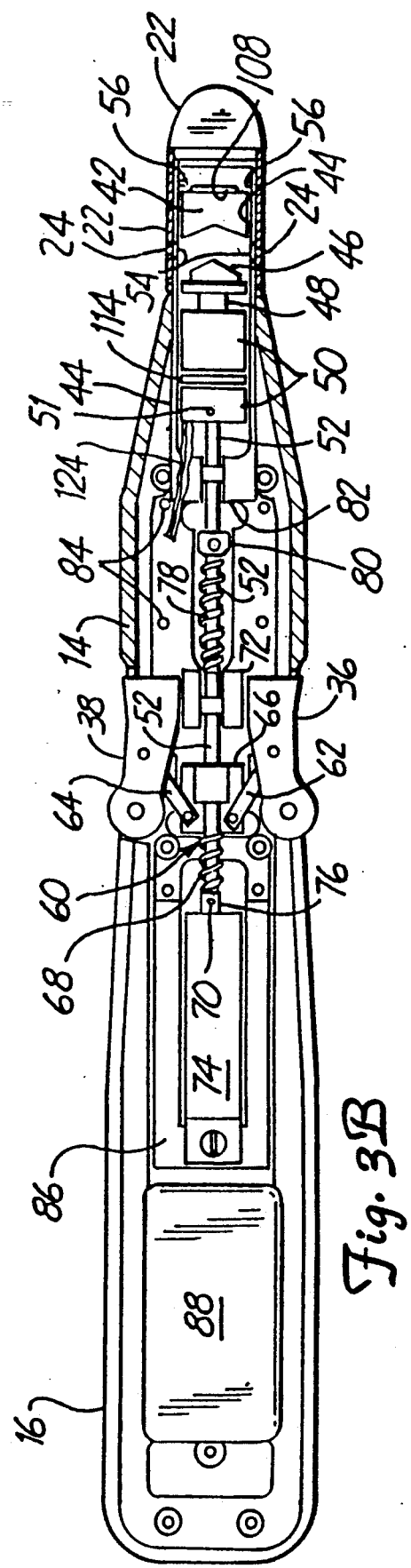
Fig. 3A
Fig. 3B

FIBER IDENTIFIER

BACKGROUND OF THE INVENTION

1. Field of the Invention

The present invention generally relates to devices for testing communications equipment, and more particularly to a device for testing the operation of an optical fiber which may be carrying an active signal.

2. Description of the Prior Art

In recent years, fiber optic cables have replaced traditional copper wire as the preferred medium for telecommunications. Although optical fibers have certain advantages over copper wire, they are still subject to faults (which may result during installation or from environmental factors after installation), and may also accidentally be "miswired," i.e., improperly routed to or from the optical transmitters and receivers. For these and other reasons, it is often necessary to identify one particular fiber out of a large group of such fibers carried in a common cable.

Identification of a particular optical fiber is an inherently difficult task, since direct connection of the fiber to an optical detector would require cutting the fiber, which is highly undesirable. First of all, the fibers being tested are often active, and cutting the fiber would lead to an enormous data loss. Also, a cut fiber must be reconnected by the use of an optical splice which attenuates the communication signals and can create interfering reflections. Furthermore, since a trial-and-error method must often be used to pinpoint the particular fiber, this could result in literally dozens of cut fibers and splice assemblies. Color-coding the outer buffer of the fibers is insufficient where a large number of fibers are present, or where the records of the color-coding are incorrect. Fortunately, a technique has been devised for detecting test signals being carried on an optical fiber without the need of cutting the fiber.

This technique relates to the manner in which a portion of the transmitted light "leaks" out at microbends in the fiber. The degree to which the fiber must be bent in order to obtain such leakage is a function of the relative indices of refraction between the fiber core and its cladding, and between the cladding and the outer buffer. In U.S. Pat. Nos. 4,728,169 and 4,790,617 (both issued to Campbell et al.), this principle is used to optimize the alignment of two fibers which are to be spliced together. Those patents describe a manner of injecting light into the fiber as well as withdrawing a portion of the light.

In U.S. Pat. No. 4,759,605 issued to Shen et al., this same principle is used to extract light from a fiber without cutting the fiber. The device disclosed in that patent utilizes a convex element to forcibly urge the fiber into contact with a concave surface. The concave surface is light transmissive and is attached to an optical detector. Shen et al. does not give any indication of the mechanical means by which the convex element is moved relative to the concave surface.

A more detailed description of an optical fiber handling apparatus is given in European patent application No. 89300290.7 filed by James et al. (related devices are shown in European Patent Application No. 89300330.1, and Patent Cooperation Treaty Application No. PCT/GB88/00225). That apparatus utilizes a spring-loaded plunger which forces the fiber against a concave waveguide. The disclosed embodiments, however, suffer from several disadvantages. First of all, the leakage occurs along a 180° arc, which creates excessive loss. This could lead to fatal attenuation of traffic comprising actual communications data. The structure of the James et al. device also requires two other 90° curves in the fiber, resulting in further losses.

Additionally, the spring loading of the plunger creates an abrupt bending action which is undesirable for two reasons. First of all, this may result in mechanical damage to the fiber. Secondly, it can disrupt transmission of data traffic in the fiber. Relaxation (i.e., release) of the fiber can also disrupt transmission if it occurs too quickly. This is due to the fact that optical amplifiers will ramp the amplification up or down depending upon the strength of the transmitted signal, in order to achieve a more stable output. Quick bending or unbending of the fiber creates a momentary change in the signal strength which may be shorter in duration than the response time of the optical amplifier, leading to unacceptable amplifier performance. This is particularly crucial for high-speed data transmission, such as DS3 communications which transmit about 45 megabits per second.

Finally, there is no mechanism in the James et al. apparatus for limiting the force applied by the plunger; even if the plunger were moved in a controlled fashion, excess stationary force could result in deformation of the fiber, which might require repair by cutting away the damaged portion and splicing the fiber back together. It would, therefore, be desirable and advantageous to devise an apparatus for identifying optical fibers which minimizes disruptions in real data traffic, and avoids excess deformation of the fiber under test.

SUMMARY OF THE INVENTION

The foregoing objective is achieved in a fiber identifier having a piston which positions a portion of the fiber under test against an optical detector, the piston being located within a housing, and connected to an actuation mechanism which includes means for damping any movement of the housing. The damping means controls the movement rate of the piston to slowly bend the fiber, minimizing disruption of any signal flowing through the fiber and preventing undue mechanical stress which could damage the fiber. First bias means are provided to urge the housing and piston toward the optical detector, but second bias means within the housing are used to limit the pressure applied by the piston against the optical fiber.

Means are further provided in the housing for sensing the relative position of the piston and, indirectly, the position of a drive rod. This facilitates calibration of the opto-electronics portion of the instrument, and allows the instrument to detect a jam in the drive rod. The optical detector includes means for determining the direction of any signals passing through the fiber. A display indicates such signal traffic, as well as the presence of a test signal, or no signal at all. A hood surrounds the detector to prevent interference by ambient light.

BRIEF DESCRIPTION OF THE DRAWINGS

The novel features and scope of the invention are set forth in the appended claims. The invention itself, however, will best be understood by reference to the accompanying drawings, wherein:

FIG. 1 is a perspective view of the fiber identifier of the present invention;

FIG. 2 is a side elevational view of the fiber identifier with the battery compartment door open;

FIG. 3A is a plan view of the bottom half of the fiber identifier, partially in section, taken along lines 3—3 of FIG. 2, illustrating the actuation mechanism in its relaxed state;

FIG. 3B is another plan view similar to FIG. 3A, but the actuation mechanism is shown in its retracted state;

FIG. is a transverse sectional view of the optical detector used in the fiber identifier of the present invention.

DESCRIPTION OF THE PREFERRED EMBODIMENT

Figure 4:
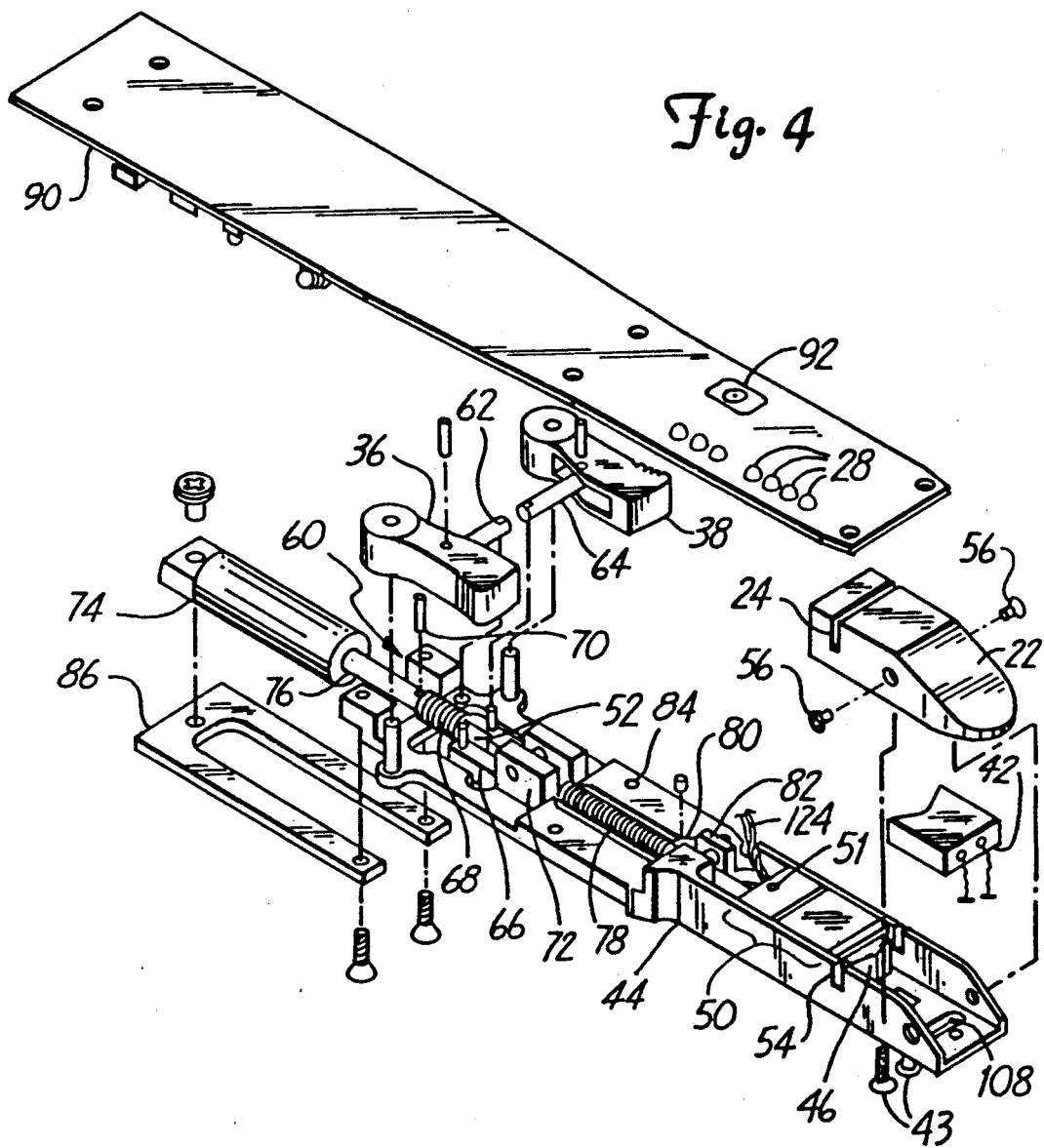
FIG. 4 is an exploded perspective view of the interior components of the fiber identifier.

With reference now to the drawings, and in particular with reference to FIGS. 1 and 2, there is depicted the fiber identifier 10 constructed according to the present invention. Fiber identifier 10 includes a main hollow body 12 formed of top and bottom portions 14 and 16, respectively, and having an open front end 18. Body 12 is constructed of any durable material, preferably an engineering plastic such as acrylonitrile butadiene styrene (ABS). Top and bottom portions 14 and 16 may be attached by any convenient means, including the use of mechanical fasteners, adhesives, or sonic welding. Bottom portion 16 has a ridge 20 along its underside forming an internal channel which accommodates electrical wiring within body 12. Although the size of body 12 may vary greatly, it should be small enough to be held in one hand, and the preferred embodiment is about 30 cm long, 4 cm wide and 3.5 cm high.

A hood 22 is attached to front end 18 and has a slot 24 therein for receiving a portion of the fiber under test (FUT). Hood 22 is preferably tapered to facilitate separation of optical fibers amassed in a bundle. Top portion 14 includes a panel 26 having a plurality of annunciators 28 and an on/off button 30. The function of annunciators 28 is explained further below. Panel 26 may be molded integrally with top portion 14 or may take the form of a decal or label. Top and bottom portions 14 and 16 also have hubs 32 and 34, respectively, for pivotally securing an actuation lever 36. A second pair of hubs secure another actuation lever 38 not visible in FIGS. 1 and 2. Although fiber identifier 10 may be connected to an external power supply, it is advantageous to provide a battery within a compartment in body 12. FIG. 2 shows the door 40 of the compartment in an open position. Door 40 may snap into a closed position, or may be provided with a fastener (e.g., screw) to securely close it.

With further reference to FIGS. 3A and 3B, the interior features of fiber identifier 10 are explained. These features are additionally illustrated in the exploded perspective of FIG. 4. The FUT is analyzed by an optical detector 42 in front end 18 of the instrument. Detector 42 is actually affixed (by screws 43) to a guide member 44 which lies within, and is attached to, bottom portion 16 of body 12; one end of guide member 44 exits open end 18. The FUT is pushed against detector 42 by means of a piston 46. This interface is discussed further below in conjunction with FIG. 5.

Piston 46 includes a shaft 48 which exits from a piston housing 50. Piston housing 50 is attached (by set screw 51) to a drive rod 52 which moves longitudinally within bottom portion 16 of body 12. Thus, piston housing 50 moves relative to detector 42, and piston 46 additionally moves relative to piston housing 50 (further explained in conjunction with FIG. 6). Piston housing 50 is guided by the sidewalls of guide member 44, which have slots 54 therein. Slots 54, best seen in FIG. 4, are aligned with slots 24 in hood 22 when the hood is placed over the end of guide member 44. Hood 22 is affixed to guide member 44 by screws 56. Slot 24 is very thin, e.g., 1 mm, to limit the amount of ambient light entering hood 22.

Drive rod 52 is retracted by an actuation mechanism 60, which includes levers 36 and 38, linkage arms 62 and 64, a sliding block 66, and a retraction or opening spring 68. Linkage arms 62 and 64 are pivotally attached to levers 36 and 38, respectively, and are also pivotally attached to sliding block 66. A portion of sliding block 66 surrounds rod 52, but block 66 is not affixed thereto. Opening spring 68 is wound around rod 52, and is in contact with sliding block 66 at one end, and with a pin 70 attached to rod 52 at the other end. In FIG. 3A, which shows actuation mechanism 60 in its relaxed state, opening spring 68 is also in a relaxed state, i.e., it is loosely held between sliding block 66 and pin 70. Sliding block 66 cannot move to the right in that figure as it is abutting a boss 72 (preferably formed integrally with guide member 44).

With this construction, as levers 36 and 38 are squeezed toward body 12, the force generated is translated, via linkage arms 62 and 64, to sliding block 66, causing it to move away from boss 72. This compresses opening spring 68 against pin 70, pulling drive rod 52, and hence piston 46, away from detector 42. FIG. 3B illustrates the retracted state of actuation mechanism 60; the FUT is placed in or taken out of the instrument while in this state. Although spring 68 may slightly dampen an abrupt movement of levers 32 and 36, the movement rate of rod 52 is primarily controlled by a damper 74. Pin 70 attaches the shaft 76 of damper 74 to rod 52. Damper shaft 76 and rod 52 could be integrally formed although it would still be necessary to provide a pin or bump thereon to abut the end of spring 68.

Damper 74 may take several forms but, in the preferred embodiment, it consists of a cylinder surrounding a disc (not shown) attached to shaft 76. The disc has one or more restrictive orifices which pass a viscous fluid within the cylinder. Of course, a seal is needed around shaft 76 to prevent leakage of the fluid. An internal spring (not shown) is also provided to bias shaft 76 to its extended position. This construction is similar to a conventional shock absorber, and provides two-way damping. In the preferred embodiment, the viscosity of the fluid and the modulus of the internal spring are chosen to yield a retracting (opening) load which is twice the extending (closing) load.

When levers 36 and 38 are released, opening spring 68 moves to a relaxed position, and sliding block 66 slides over rod 52 to abut block 72, without influencing the movement of rod 52. At the same time, a closing spring 78 pushes rod 52, and hence piston 46, back toward detector 42. Closing spring 78 is compressed between fixed boss 72 and a set collar so attached to rod 52. The position of set collar 80 along rod 52 also limits the extension of rod 52, since set collar so abuts another boss 82. If a fiber has been placed in slot 24, this action captures the fiber between piston 46 and detector 42. This movement is also regulated by damper 74.

Guide member 44 is attached to the inside of body 12 by any convenient means, such as screws 84. In the preferred embodiment, a bracket 86 is attached to guide member 44, and the far end of damper 74 is attached to bracket 86. The compartment 88 for the battery is also visible in FIGS. 3A and 3B; compartment 88 is preferably molded integrally with bottom portion 16 of body 12. One additional element seen in FIG. 4 is the printed circuit board (PCB) 90 which supports the electronic subassembly for fiber identifier 10. Annunciators 28 (e.g., light-emitting diodes) are connected to PCB 90. A membrane switch 92 is also mounted and aligned with on/off button 30 on panel 26.

Figure 5:
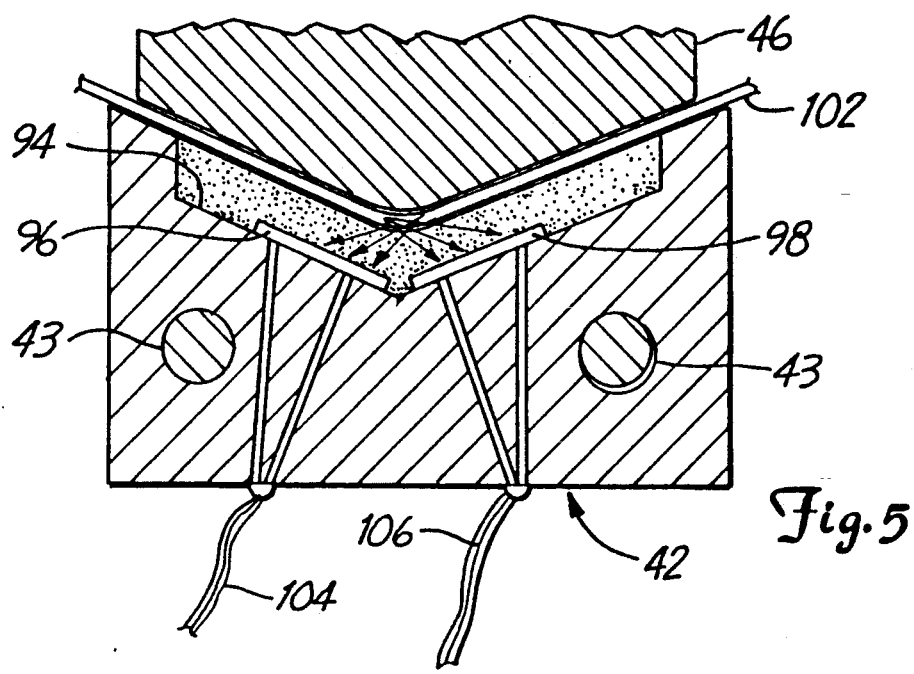

Referring now to FIG. 5, a detailed cross-section of detector 42, and its interface with piston 46, is shown. It is understood that several conventional detectors exit which may be used for detector 42; the following description is merely a preferred form of the optical detection means. Detector 42 has a V-shaped cavity 94 therein, with two PIN photodiodes 96 and 98 being symmetrically placed on the walls of cavity 94. The cavity is filled with an optical transmission medium 100; optical transmission medium 100 does not act as a waveguide but rather simply provides index matching for maximum signal reception by the PIN diodes. An appropriate medium is an epoxy sold by EPOTEK under product number 301-2, which has an index of refraction of about 1.53 for 1300 nm wavelength light.

The fiber 102 under test is urged against medium 100 by piston 46. PIN diode 96 is mounted so as to receive light leaking from one direction out of fiber 102, while PIN diode 98 is mounted to receive light leaking from the other direction, as indicated by the arrows in FIG. 5. Leakage is achieved by creating a microbend in fiber 102 at the center of detector 42; the amount of the bend is dictated by the radius of curvature of the apex of piston 46 and the radius of curvature at the center of the index-matching medium 100. As previously noted, it is important to make this bend as small as possible (i.e., provide a large radius of curvature) in order to avoid mechanical damage to the fiber and reduce loss of an active signal; however, some minimum threshold of bending is necessary to provide a sufficient amount of leakage which can be detected by the PIN diodes. In the preferred embodiment, the radius of curvature of the piston apex is about 6.1 mm, and the radius of curvature at the center of medium 100 is about 6.35 mm. The thickness of fiber 102 accounts for the difference between these two values.

Wire pairs 104 and 106 emanate from PIN diodes 96 and 98, respectively. In the disclosed embodiment, these wires pass through a hole 108 in guide member 44 and travel along the inner channel formed by ridge 20 in bottom portion 16 of body 12. Near the middle of body 12, the wire pairs are conveyed upwards to PCB 90, which has conventional electronic components for analyzing the signals received by the PIN diodes. Several circuits for such analysis will become apparent to those skilled in the art. The circuitry preferably includes means, connected to annunciators 28, for indicating (i) the direction of travel of any active signals in the FUT, (ii) the presence of a known test signal (e.g., a one kilohertz modulated light signal), or (iii) the lack of any signal at all. One of the annunciators may also be used to indicate that the battery needs to be recharged or replaced.

Figure 6:
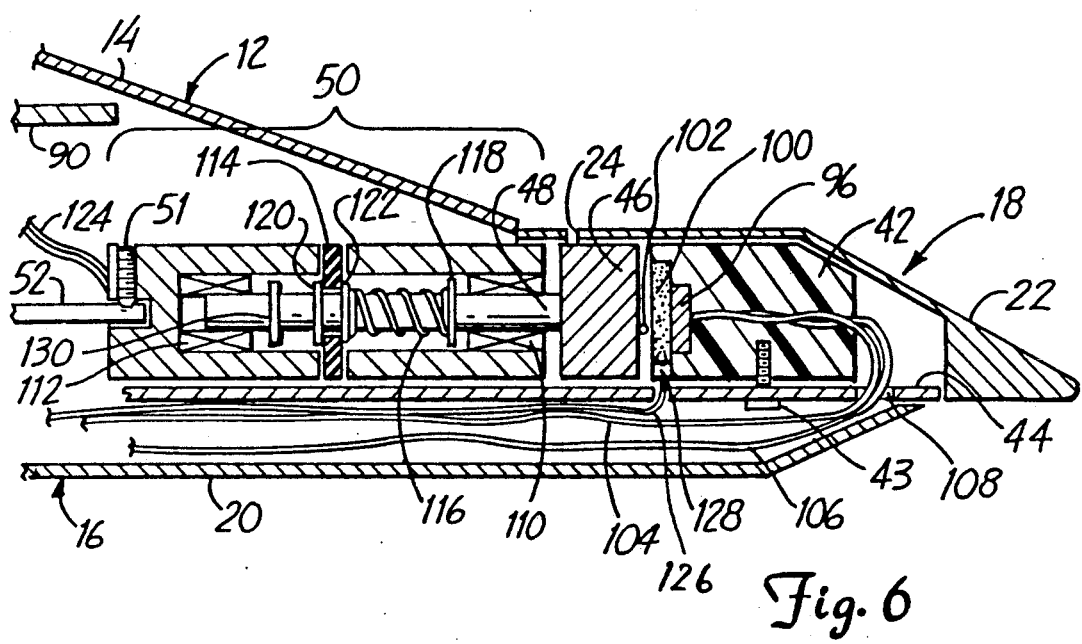
FIG. 6 is a longitudinal sectional view taken along lines 6—6 of FIG. 3A showing the optical detector, piston, piston housing and sensor contacts.

As mentioned above, it is also important to limit the amount of force applied to fiber 102 when held between piston 46 and detector 42. In the present invention, bias means are provided separate from closing spring 78 for carefully limiting the pressure on fiber 102. As shown in FIG. 6, piston shaft 48 is held within housing 50 by two bearings 110 and 112. Shaft 48 also passes through a hole in an insulative, rigid (e.g., fiberglass) board 114, which divides housing 50 into two chambers. A precision spring 116 surrounds shaft 48, abutting board 114, and held in compression by a snap ring 118 which fits in an annular groove in shaft 48. Since piston spring 116 is isolated from closing spring 78 (by set collar 80 which abuts block 82), the force applied by piston 46 is determined solely by spring 116. This construction thus provides a precise load on the FUT. As those skilled in the art will appreciate, the spring rates of springs 68 and 78 are not critical since spring 116 governs the pressure applied by piston 46; the spring rate of precision spring 116 is, however, important. In the preferred embodiment, the approximate spring rates are as follows: opening spring 68—10.51 N/mm; closing spring 78—0.876 N/mm; piston spring 116—0.36 N/mm.

The provision of board 114 within housing 50 may advantageously be used to provide novel means for sensing the position of piston 46. Board 114 has two conductive pads 120 and 122 on either surface, but these pads are electrically isolated due to the insulative nature of board 114. A wire pair 124 is connected to the pads and to appropriate analyzing circuitry on PCB 90. A third wire 126 is connected to a contact point 128 on detector 42. The sensing means of the present invention requires that piston spring 116, piston shaft 48 and piston 46 all be conductive, whereby piston 46 is in continuous electrical contact with contact pad 122. Another (conductive) snap ring 130 is also necessary, attached to shaft 48 proximate contact pad 120. Snap ring 130 may touch contact pad 120, but only if rod 52 is partially retracted; in other words, snap ring 130 does not touch contact pad 120 if piston 46 is abutting detector 42.

With this arrangement of contacts, three different states of piston 46 may be discerned. First, when piston 46 is fully abutting detector 42, a circuit is completed between contact pad 122 and contact point 128. This corresponds to the absence of any fiber in the instrument, and facilitates proper calibration based on the amount of ambient light detected by photodiodes 96 and 98 while piston 46 is in this position.

In a second state, piston 46 is not touching contact point 128, but snap ring 130 is touching contact pad 120. This completes a circuit between the two contact pads on board 114 and, as noted above, can only occur if rod 52 is in an open position (retracted). If the user has placed a fiber in slot 24 and already released levers 36 and 38, then sensing of this state means that rod 52 is jammed or foreign material has blocked the movement of housing 50.

The third state which may be sensed occurs when neither of the foregoing states are present, i.e., when piston 46 is not touching contact point 128, and snap ring 130 is not touching contact pad 120. This corresponds to the operative state of fiber identifier 10 wherein the FUT is held firmly in place between piston 46 and detector 42. One or more of the annunciators 28 may be used to indicate each of the foregoing states.

The sensing means associated with piston housing 50 could be further modified to provide additional sensing ability. For example, another contact point (not shown) could be provided on bearing 112. If snap ring 130 were touching this contact point after release of levers 36 and 38, this would indicate that piston shaft 48 was jammed (as opposed to jamming of rod 52), possibly by the presence of foreign material between piston 46 and detector 42.

The foregoing description of fiber identifier 10 suggests several significant advantages besides (i) controlling the movement rate of piston housing 50, (ii) limiting the precise load applied to the FUT, and (iii) sensing the state of the piston relative to the detector. For example, the linkage arrangement in actuation mechanism 60 allows the user to exert a relatively high force on rod 52 with minimal push force on, and minimum travel distance of, levers 36 and 38. The balanced actuation between the levers also provides a tactical feel that enhances operator performance. Actuation may further be achieved with only one hand, left or right, and positioning of the levers near front end 18 facilitates hand-eye coordination during insertion of the fiber in slot 24.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. An apparatus for positioning an optical fiber against an optical detector, comprising:
   a body containing the optical detector;
   a piston member located in said body, adjacent the optical detector for positioning the fiber against the optical detector;
   a rod member attached to said piston member;
   actuation means attached to said body for longitudinally moving said rod member; and
   means for controlling the movement rate of said rod member regardless of the movement rate of said actuation means.

2. The apparatus of claim 1 further comprising means for sensing the position of said piston member relative to the optical detector.

3. The apparatus of claim 1 further comprising means for biasing said piston member against the optical detector.

4. The apparatus of claim 1 further comprising hood means for limiting ambient light from entering the optical detector, said hood means having a slot for receiving the optical fiber.

5. The apparatus of claim 1 wherein said means for controlling the movement rate of said rod member comprises a damper attached to said rod member.

6. The apparatus of claim 1 wherein said actuation means includes:
   a spring surrounding a portion of said rod member, said spring having first and second ends;
   means attached to said rod member for abutting said first end of said spring;
   a lever member; and
   linkage means, disposed between said spring and said piston member for coupling said lever member to said second end of said spring.

7. The apparatus of claim 3 wherein said biasing means comprises:
   a first boss member located within and attached to said body, proximate said rod member;
   a closing spring surrounding a portion of said rod member lying between said piston member and said boss member, said spring having first and second ends, said first end abutting said boss member; and
   collar means attached to said rod member for abutting said second end of said spring.

8. The apparatus of claim 6 wherein said linkage means comprises:
   a block slidably surrounding a portion of said rod member, said block abutting said second end of said spring; and
   at least one linkage arm having first and second ends, said first end being pivotally attached to said block and said second end being pivotally attached to said lever member.

9. The apparatus of claim 7 further comprising:
   a shaft attached to said piston member;
   means for housing said piston shaft, one end of said rod member being fixed to said housing means;
   a second boss member located within and attached to said body, disposed between said spring and said piston member, for abutting said collar means and limiting extension of said spring; and
   means for pushing said piston shaft out of said housing means toward the optical detector.

10. An apparatus for positioning an optical fiber against an optical detector, comprising:
    a body containing the optical detector;
    a piston located in said body, adjacent the optical detector for positioning the fiber against the optical detector, said piston having a shaft;
    means for housing said shaft;
    a rod having first and second ends, said first end being attached to said housing means;
    actuation means attached to said body and linked to said rod for longitudinally moving said rod; and
    means, located with said housing means and coupled to said shaft, for limiting a force applied by said piston against the optical detector.

11. The apparatus of claim 10 further comprising means for controlling the movement rate of said rod member regardless of the movement rate of said actuation means.

12. The apparatus of claim 10 further comprising means for sensing the position of said piston member relative to the optical detector.

13. The apparatus of claim 10 wherein said limiting means includes:
    bearing means, located within said housing means, for slidably receiving said shaft; and
    precision spring means for coupling said shaft to said housing means.

14. The apparatus of claim 13 further comprising:
    means for biasing said rod toward the optical detector; and
    means for mechanically isolating said biasing means from said limiting means.

15. An apparatus for positioning an optical fiber against an optical detector, comprising:
    a body containing the optical detector;
    a piston located in said body, adjacent the optical detector for positioning the fiber against the optical detector;
    a housing for said piston;
    a rod having first and second ends, said first end being attached to said housing;

actuation means attached to said body and linked to said rod for longitudinally moving said rod from an open position to a closed position; and means for separately sensing (i) when said piston abuts The optical detector, and (ii) when said rod is in said open position.

16. The apparatus of claim 15 wherein:

said piston has a shaft having a free end, said piston and shaft both being electrically conductive;

said housing includes bearing means for receiving said shaft; and said sensing means comprises:

an electrically insulative board having.
  first and second surfaces, placed in said housing and defining first and second chambers in said housing, said board having a hole therein and said shaft passing through said first chamber and said hole, said free end of said shaft being disposed in said second chamber,
  first and second electrically conductive pads affixed to said first and second surfaces of said board, respectively,
  a first snap ring attached to said shaft in said first chamber,
  a second snap ring attached to said shaft in said second chamber, said second snap ring being electrically conductive,
  a spring surrounding a portion of said shaft in said first chamber, said spring having first and second ends, said first end abutting said first conductive pad and said second end abutting said first snap ring, said spring biasing said piston toward the optical detector and biasing said second snap ring toward said second conductive pad,
  an electrically conductive contact point attached to the optical detector proximate said piston, and
  wire means for connecting said first and second conductive pads and said contact point to analyzing circuitry.

17. In a fiber optic test instrument having an optical detector and a piston for positioning an optical fiber against the optical detector, an actuation mechanism for moving the piston, the actuation mechanism comprising:

a rod having first and second ends, said first end being attached to said piston;

a damper having a shaft attached to said second end of said rod for controlling the movement rate of said rod;

first and second levers pivotally attached to the instrument, each of said levers having a relaxed position and a retracted position;

linkage means for coupling said first and second levers to said rod; and means connected to said rod and said linkage means for biasing both of said levers toward said open position.

18. The actuation mechanism of claim 17 wherein:

said first and second levers are disposed on opposite sides of said rod, both of said levers pivoting in a plane defined by said rod, and said levers being in close proximity to allow manipulation with one hand;

said biasing means comprises
  a spring surrounding a portion of said rod proximate said second end thereof, said spring having first and second ends, and
  means attached to said second end of said rod for abutting said first end of said spring; and said linkage means comprises
  a block slidably surrounding a portion of said rod member, said block abutting said second end of said spring,
  a first linkage arm having first and second ends, said first end being pivotally attached to said block and said second end being pivotally attached to said first lever, and
  a second linkage arm having first and second ends, said first end being pivotally attached to said block and said second end being pivotally attached to said second lever.

19. A fiber identifier for detecting the presence or absence of an optical signal in an optical fiber, comprising:

a hollow body having an open front end;

a guide member located within and attached to said body, one end of said guide member exiting through said open front end;

a housing located within said guide member proximate said end thereof;

a piston having a shaft aligned with said guide member, said shaft slidably connected to said housing, and said piston directed toward said end of said guide member;

optical detection means for detecting a light signal. attached to said end of said guide member, adjacent said piston, whereby said piston may abut said optical detection means;

a hood attached to said end of said guide member, surrounding said optical detection means;

a rod aligned with said guide member, having first and second ends, said first end being attached to said housing, said rod having a relaxed position and a retracted position;

actuation means attached to said body for longitudinally moving said rod from said relaxed position to said retracted position;

means for biasing said rod toward said relaxed position, resulting in said piston applying a force against said optical detection means;

means for controlling the movement rate of said rod regardless of the movement rate of said actuation means;

means for limiting the force applied by said piston against said optical detection means; and means for separately sensing (i) when said piston abuts the optical detector, and (ii) when said rod is in said retracted position.

20. The fiber identifier of claim 19 wherein said actuation means includes:

a spring surrounding a portion of said rod, said spring having first and second ends;

means attached to said second end of said rod for abutting said first end of said spring;

lever members; and linkage means, disposed between said spring and said first end of said rod, for coupling said lever member to said end of said spring.

21. The fiber identifier of claim 19 wherein said limiting means comprises a precision spring coupled to said shaft, said precision spring located within said housing.

22. The fiber identifier of claim 19 wherein:

said shaft has a free end, said piston and shaft both being electrically conductive; and said sensing means comprises:

an electrically insulative board having first and second surfaces, placed in said housing and defining first and second chambers in said housing, said board having a hole therein and said shaft passing through said first chamber and said hole, said free end of said shaft being disposed in said second chamber, first and second electrically conductive pads affixed to said first and second surfaces of said board, respectively, a first snap ring attached to said shaft in said first chamber, a second snap ring attached to said shaft in said second chamber, said second snap ring being electrically conductive, a precision spring surrounding a portion of said shaft in said first chamber, said spring having first and second ends, said first end abutting said first conductive pad and said second end abutting said first snap ring, said spring biasing said piston toward said optical detection means and biasing said second snap ring toward said second conductive pad, an electrically conductive contact point attached to said optical detection means adjacent said piston, and wire means for connecting said first and second conductive pads and said contact point to analyzing circuitry.

23. The apparatus of claim 3 wherein said biasing means causes said piston member to apply force against the optical detector, and further comprising means for limiting said force.

* * * * *